(12) United States Patent
Madan et al.

(10) Patent No.: US 12,254,180 B2
(45) Date of Patent: Mar. 18, 2025

(54) METHOD TO OPPORTUNISTICALLY REDUCE THE NUMBER OF SSD IOs, AND REDUCE THE ENCRYPTION PAYLOAD, IN AN SSD BASED CACHE IN A DEDUPLICATION FILE SYSTEM

(71) Applicant: DELL PRODUCTS L.P., Round Rock, TX (US)

(72) Inventors: Nitin Madan, Cupertino, CA (US); Kedar Godbole, Pune (IN); Sandeep Nirmale, Santa Clara, CA (US); Rajendra Kumar Bhairy Raj, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 12 days.

(21) Appl. No.: 17/583,730

(22) Filed: Jan. 25, 2022

(65) Prior Publication Data
US 2023/0236725 A1    Jul. 27, 2023

(51) Int. Cl.
*G06F 3/06* (2006.01)
*G06F 12/0802* (2016.01)
*H04L 9/06* (2006.01)

(52) U.S. Cl.
CPC ............ *G06F 3/061* (2013.01); *G06F 3/0656* (2013.01); *G06F 3/0679* (2013.01); *G06F 12/0802* (2013.01); *G06F 2212/1056* (2013.01); *G06F 2212/401* (2013.01); *H04L 9/0643* (2013.01)

(58) Field of Classification Search
CPC ..................................................... H04L 9/0643
See application file for complete search history.

(56) References Cited

U.S. PATENT DOCUMENTS

| | | | |
|---|---|---|---|
| 2012/0102295 A1* | 4/2012 | Yang | G06F 12/0246 711/E12.078 |
| 2012/0297248 A1* | 11/2012 | Bennett | G06F 12/0246 711/E12.001 |
| 2013/0342375 A1* | 12/2013 | Manning | H03M 7/6082 341/87 |
| 2015/0058576 A1* | 2/2015 | Galbraith | G06F 12/0886 711/133 |
| 2016/0004636 A1* | 1/2016 | Yang | G06F 12/0886 711/118 |
| 2016/0179400 A1* | 6/2016 | Batra | G06F 3/0664 711/154 |

(Continued)

*Primary Examiner* — Nanci N Wong
(74) *Attorney, Agent, or Firm* — WOMBLE BOND DICKINSON (US) LLP

(57) ABSTRACT

Disclosed is a storage system comprising: receiving a first data segment and first metadata associated with the first data segment to be stored in the storage system; storing the first data segment and the first metadata in a persistent storage device of the storage system; compressing the first data segment using a predetermined compression algorithm to generate a first compressed data segment; and storing the first metadata and the first compressed data segment in a solid state drive (SSD) cache device of the storage system, including aligning the first metadata and the first compressed data segment to a page boundary of the SSD device to reduce a number of input and output (IO) operations required for accessing the first metadata and the first compressed data segment from the SSD cache device.

20 Claims, 11 Drawing Sheets

(56) References Cited

U.S. PATENT DOCUMENTS

2021/0081329 A1\* 3/2021 Yokoyama .......... G06F 12/0871
2021/0294499 A1\* 9/2021 Wang ..................... G06F 3/064
2021/0374056 A1\* 12/2021 Malladi ............... G06F 9/30047

\* cited by examiner

METHOD TO OPPORTUNISTICALLY REDUCE THE NUMBER OF SSD IOs, AND REDUCE THE ENCRYPTION PAYLOAD, IN AN SSD BASED CACHE IN A DEDUPLICATION FILE SYSTEM

FIELD OF THE INVENTION

Embodiments of the present invention relate generally to data storage systems. More particularly, embodiments of the invention relate to opportunistically reduce the number of solid state drive (SSD) input and output (IO)s, and reduce the encryption payload, in an SSD based cache in a deduplication file system.

BACKGROUND

Data storage utilization is continually increasing, causing the proliferation of storage system in data centers. In order to reduce storage space of a storage system, deduplication techniques are utilized, where data objects or files are segmented in chunks and only the deduplicated chunks are stored in the storage system.

General speaking, accessing data randomly is much slower and less efficient than accessing it sequentially. Simply, it is faster to write/read the same data with a single sequential I/O rather than multiple, smaller random I/Os. With Hard Disk Drives (HDDs), the penalty is worse because the extra disk head movement to gather the data from all those random I/Os is very time-consuming. With Solid State Drives (SSDs), there is not the penalty of the disk head movement, but the penalty of the storage device having to process the multiple I/Os rather than a single one.

The application below is about compressing the duplicated data segments so that they occupy fewer pages of the SSD cache device, which in turn can reduce the number of IOs when accessing the SSD cache device.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The application is about how to compress the de-duplicated data segments so that they occupy fewer pages of the SSD cache device, to reduce the number of IOs when accessing the SSD cache device. When access the SSD, an entire page has to read/written even though the data to be accessed is less than the page size. For example, the method includes compressing the data blocks in an SSD based data cache to align and reduce the number of SSD IOs, thereby increasing the overall application IOPS. In an embodiment, the method includes selectively compressing the data blocks in an SSD based data cache to align and reduce the number of SSD IOs, thereby increasing the overall application IOPS. Further, the method includes reducing the encryption payload by using compression, according to an embodiment.

Figure 1:
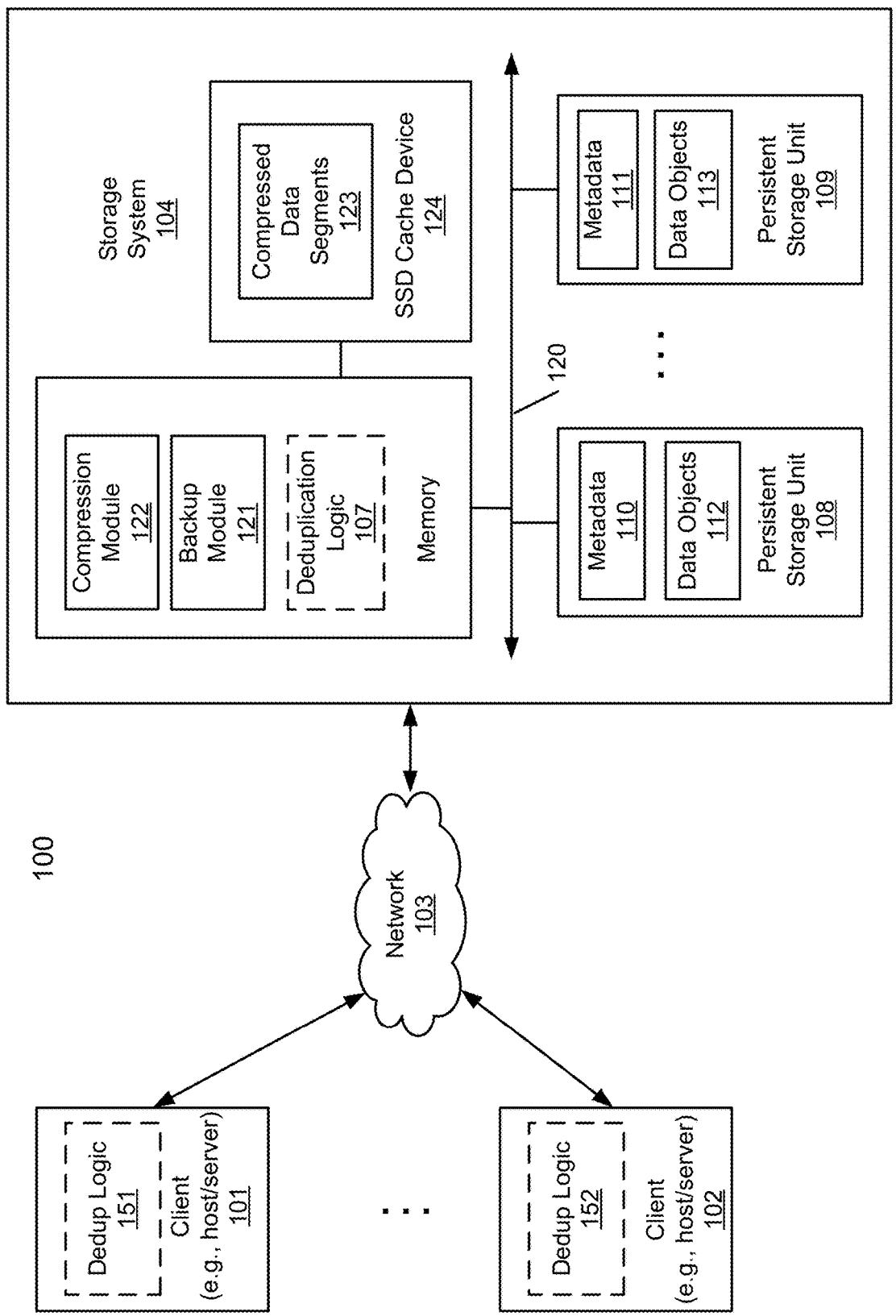
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine (also referred to as service logic, service module, or service unit, which may be implemented in software, hardware, or a combination thereof), optional deduplication logic 107, and one or more persistent storage units or devices 108-109 communicatively coupled to each other. Storage service engine may represent any storage service related components configured or adapted to provide storage services (e.g., storage as a service) to a variety of clients using any of the access protocols set forth above. For example, storage service engine may include backup logic 121, restore logic and compress module 122. Backup logic 121 is configured to receive and back up data from a client (e.g., clients 101-102) and to store the backup data in any one or more of persistent storage units 108-109. Restore logic is configured to retrieve and restore backup data from any one or more of persistent storage units 108-109 back to a client (e.g., clients 101-102). Compress module 122 is configured to compress and back up data from a client (e.g., clients 101-102) and to store the backup data in compress data segments 123 in SSD Cache Device 124.

Persistent storage units 108-109 may be implemented locally (e.g., single node operating environment) or remotely (e.g., multi-node operating environment) via interconnect 120, which may be a bus and/or a network (e.g., a storage network or a network similar to network 103). Persistent storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of persistent storage units 108-109 may be located locally or remotely accessible over a network.

In response to a data file to be stored in persistent storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of persistent storage units 108-109 or across at least some of persistent storage units 108-109. The metadata, such as metadata 110-111, may be stored in at least some of persistent storage units 108-109, such that files can be accessed independent of another storage unit. Metadata of each storage unit includes enough information to provide access to the files it contains.

Deduplication

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Cloud-Based/Virtualized Storage

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Replication

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

File System

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
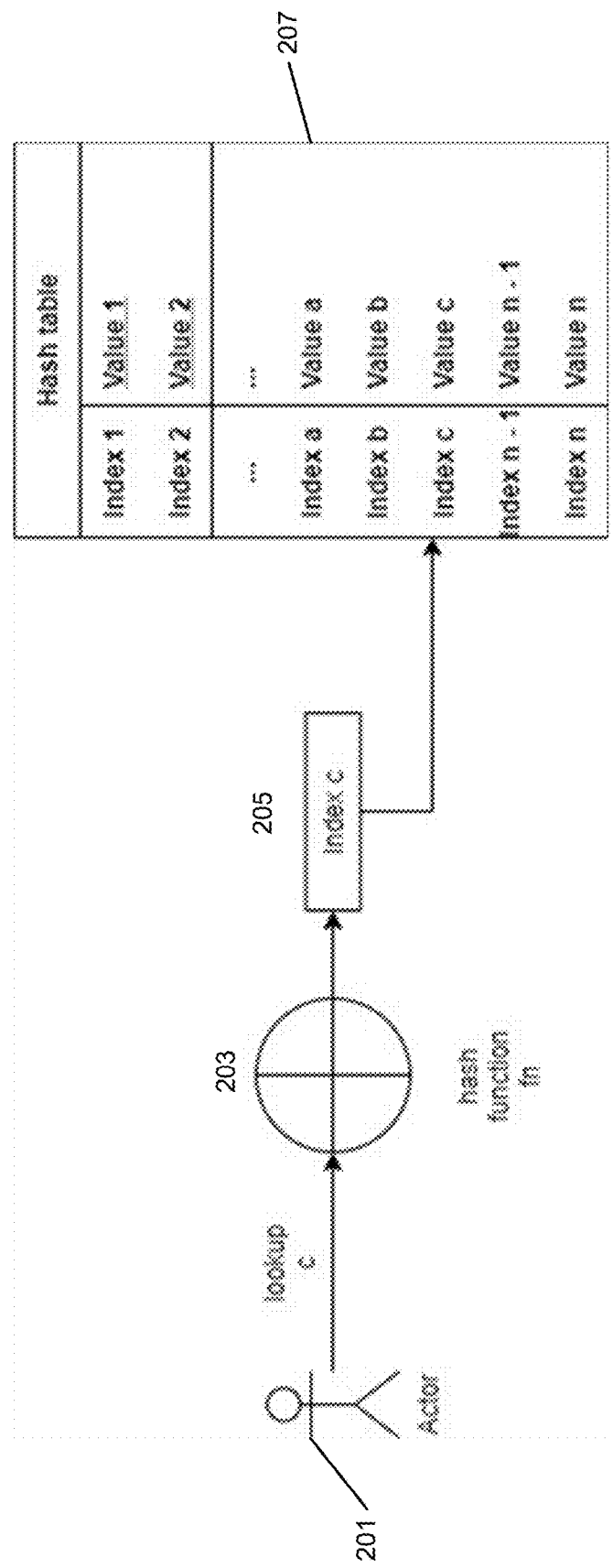
FIG. 2 is a block diagram illustrating relationships among an actor, a hash function, an index, and a hash table according to one embodiment of the invention.

FIG. 2 is block diagram 200 illustrating relationships among actor 201, hash function 203, index 205, and hash table 207 according to one embodiment of the invention. As mentioned above, the key theme in this application is to get better performance with random IO (RIO). RIO implies seeking to the offset in the file, and then reading (or writing) the extent. The seek by itself is a multi-step process in most file systems.

In order to keep track of the free and used blocks of storage, file systems employ complex metadata to remember the file: offset to disk block relationship. Some of the earliest forms of this relationship was the inode pointing to direct block/indirect block and double indirect block.

Deduplication file systems have a tougher time doing this. This is because they need to keep track of the hash (the fingerprint of the data) to the data block. The fingerprint may be shared across many files (actually, that's the point of dedupe file systems). So, the fingerprint associated with the data block must not have collisions. This basically means the fingerprint is the result of a complex hashing function and is usually large.

For example, some File Systems (e.g., Data Domain File System, DDFS) may employ a complex mutation of a SHA1 to generate a 28-byte fingerprint. The file system has to now keep track of file: offset to this 28-byte number (fingerprint), and this fingerprint to the disk block where the data corresponding to this 28-byte number is stored.

Coming back to the RIO, the file system is essentially tasked with retrieving a random set of fingerprints. It is not hard to imagine, that these seek to random portions of the file and repeated disk IOs do not yield good throughput.

For example, some storage systems (e.g., Power Protect Data Domain, DD) also employ an SSD based data cache. This cache is used to store metadata and some portion of the "hot" data to improve Random IO performance. The key theme is to use the hardware capability of the SSDs efficiently, to be able to respond to the IO request faster.

Hash tables (e.g., 207) are a very popular data structure for caches. Hash tables (e.g., 207) are basically a name-value pair. The hash function (e.g., 203) would generate an index (e.g., 205), where the "value" can be retrieved. The problem with the hash function is that there may be collisions. In classic computer science, the colliding entities are chained. Most often the value contains the key in its full form, to be compared before returning to the caller.

To add the context to the above, consider the following hash function fn which would basically take an input, and the yield an index. Since the purpose of the hash function fn is to reduce the composite to an index, given enough entries, there is a mathematical certainty of a collision.

The data structure which holds the name value pair, is classically called an index. The hash function (e.g., 203) would reduce the "name" to an index in the data structure, which holds the value.

The size of the index can be huge. In the case of huge name value pairs, this index needs to be stored on disk, and to retrieve the value, would mean seeking into the name value bucket where the value corresponding to the hash is stored.

To serve RIO workload, some storage systems (e.g., Power Protect Data Domain, DD) appliance uses a hash table (e.g., 207). The purpose of the hash table is to lookup the location of the data segment stored on the SSD (basically the offset of the data segment on the SSD volume).

The hash function (e.g., 203) would take the fingerprint as an input and figure out the index of the data segment stored. To get a perfect hit (no collisions) the index would have to be complete fingerprint. That's just too big a namespace to store in memory (we are looking at 2^28 unique indexes).

To resolve this issue, the system need to reduce the number of possible indexes, which would result in collisions. To resolve a collision, the system need to match an entry in the hash table against the full key.

There are two implementation choices at this stage. The system could store the full key along with the offset information in memory, or the system can store it on disk along with the value (as metadata). If the file system goes down, there is no way to recover the full key, if the system doesn't keep it in the metadata—so that's what some File Systems (e.g., Data Domain File System, DDFS) chose to do.

Figure 3:
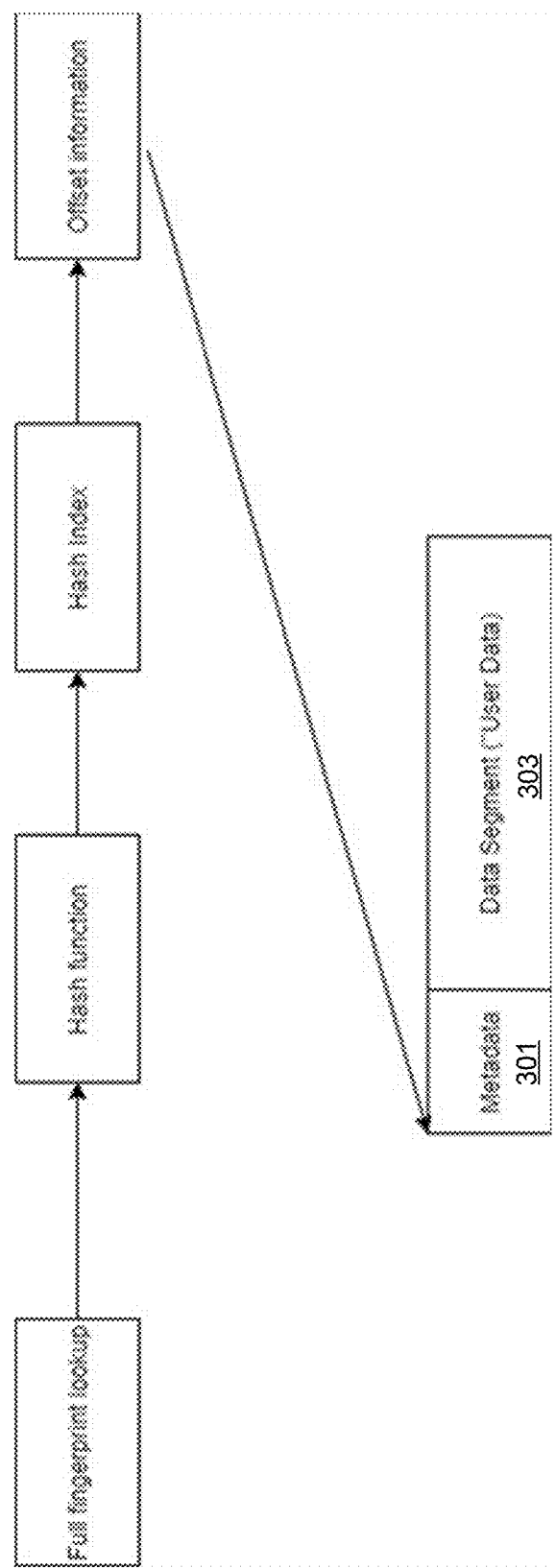
FIG. 3 is a block diagram illustrating the metadata and the data segment according to one embodiment of the invention.

FIG. 3 is block diagram 300 illustrating the metadata and the data segment according to one embodiment of the invention. Every data segment (e.g., 303) stored on the SSD has a preceding small metadata section (e.g., 301) associated with it.

Among other things, the metadata section (e.g., 301) has the full fingerprint, which is compared with the fingerprint which is looked up. This enables the file system to be certain that the data returned is that the for the fingerprint that was looked up.

However, this brings a next big concern with SSD based caches. SSD manufacturers divide the disk into 4 k pages. To ease off the wear-leveling, the manufacturers also implement a flash translation layer (FTL), which would distribute the IO load throughout the disk, to increase the life of the disk. The disk manufacturers advertise random IOPs in 4 k pages. Furthermore, when a manufacturer claims 100 k IOPs it implies that 100,000 4 k buffers can be read from the disk. If the IO size were to be 8 k instead, the IOPs drop to near half of the 100 k IOPs—so IO size matters.

The block size with most SSD manufacturers is 4096 bytes (4 kB). When a buffer for less than 4 k is requested, the disk firmware would read 4 kB and then drop the remaining buffer. Furthermore, it counts against the IOPs as 1 operation.

Figure 4:
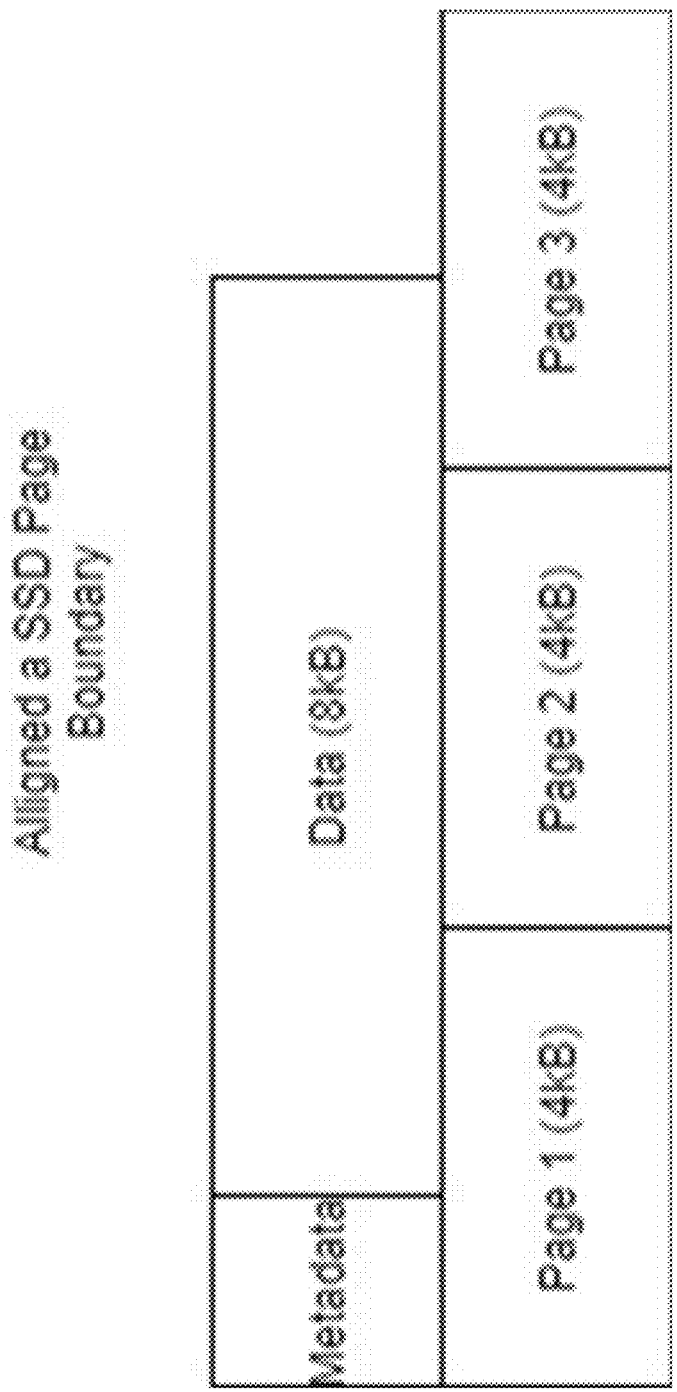
FIG. 4 is a block diagram illustrating the aligned SSD pages boundaries according to one embodiment of the invention.

Given that the average IO size for the RIO operations as seen in certain workloads (IA/IR workload) is 8 KB, reading the additional metadata section along with the segment from the data cache, increases the IO size to a value larger than 8 KB. Where the 8 KB read would have used two SSD IOs, this would now take three SSD IOs to read the buffer as shown in FIG. 4. FIG. 4 is block diagram 400 illustrating the aligned SSD pages boundaries according to one embodiment of the invention.

Figure 5:
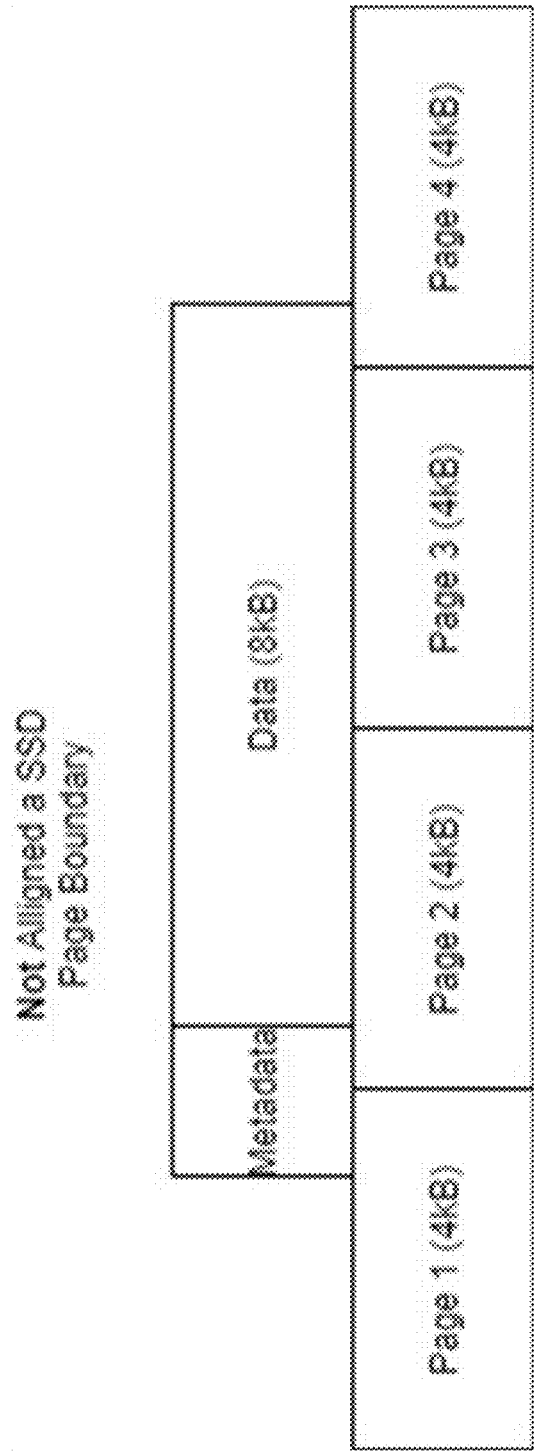
FIG. 5 is a block diagram illustrating the Not-aligned SSD pages boundaries according to one embodiment of the invention.

However, in the worst case, this becomes four SSD IOs if the buffers are not SSD page aligned as shown in FIG. 5. FIG. 5 is block diagram 500 illustrating the not-aligned SSD pages boundaries according to one embodiment of the invention.

Figure 6:
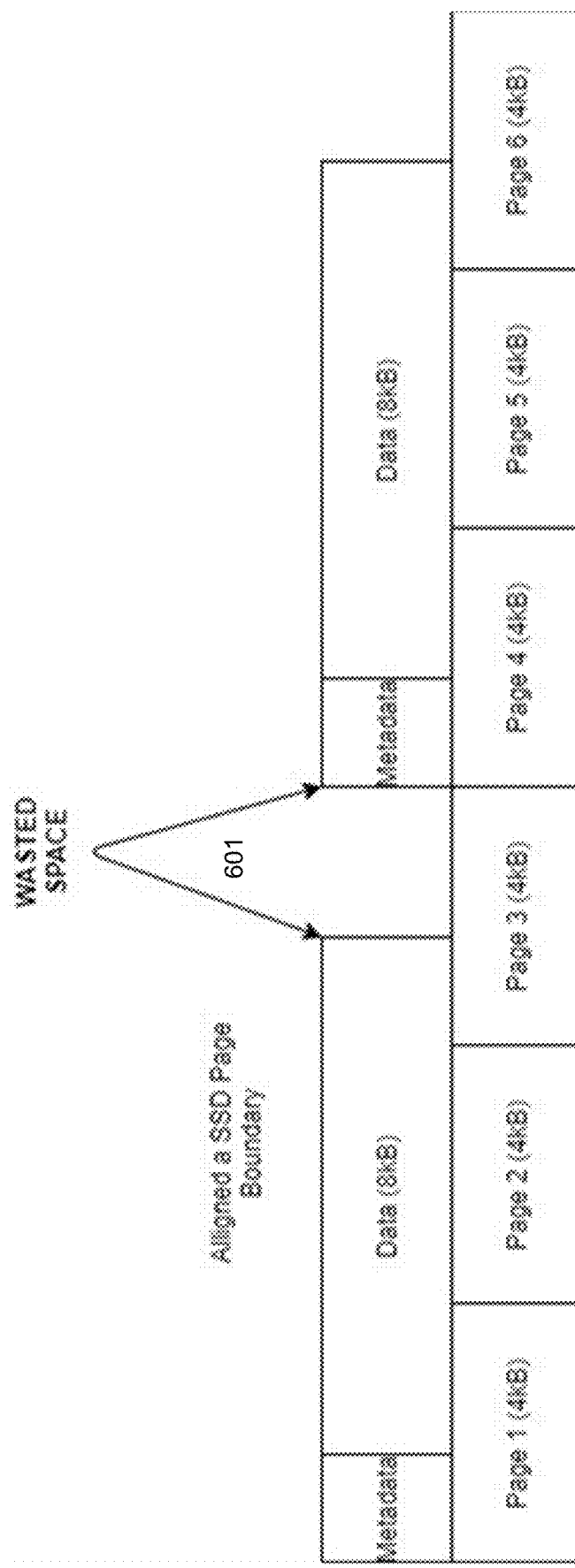
FIG. 6 is a block diagram illustrating the wasted space of the aligned SSD pages boundaries according to one embodiment of the invention.

FIG. 6 is block diagram 600 illustrating wasted space 601 of the aligned SSD pages boundaries according to one embodiment of the invention. Aligning to SSD page size to avoid the worst case of four IOs, still results in 3 IOs to read a segment from the SSD. Plus, it leads to wasting a lot of space. Given that SSD storage is premium, wasting precious space is not an option.

The key feature here is to align the pages with the start of the metadata, so that we can extract the best performance by compressing the data segment to lessen the IO usage.

In summary, current issues are: (1) There is a cost issue as SSD space is wasted with current IO sizes and it is worse when not aligned with SSD page size. (2) Due to wasted SSD space, effective data cache used size is smaller which results into lower hit ratio, as we can fit more entries within the cache.

Figure 7:
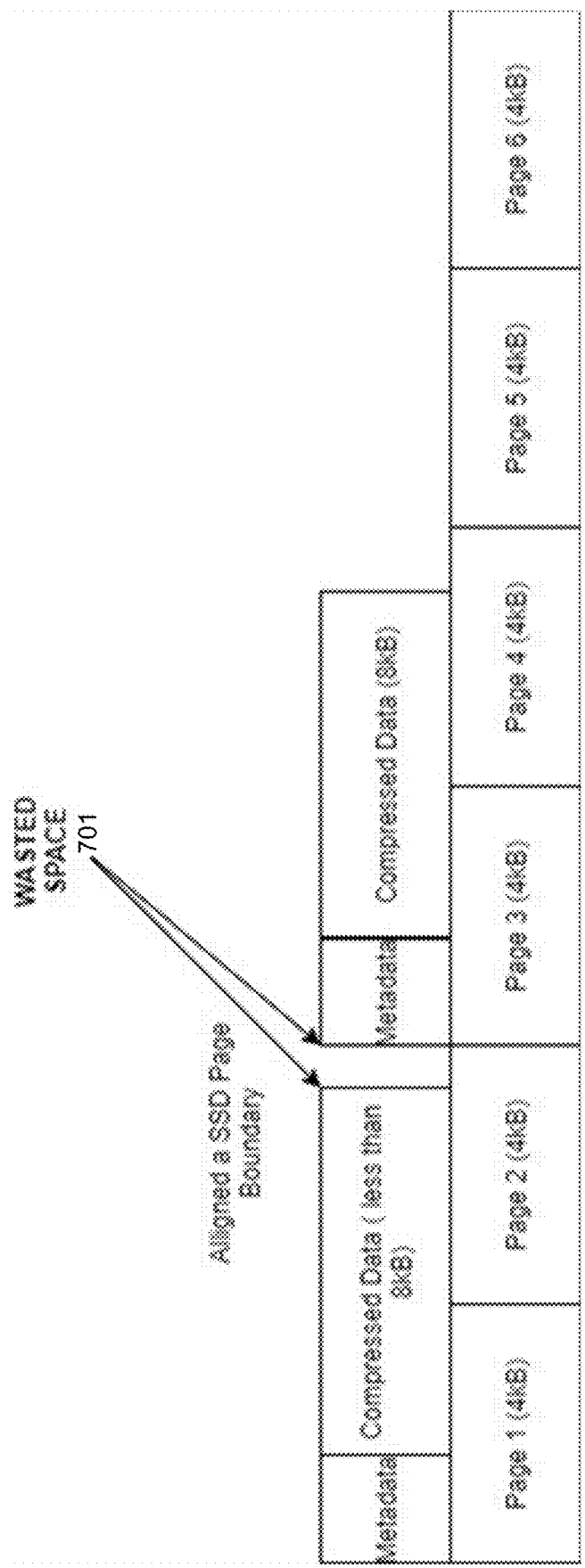
FIG. 7 is a block diagram illustrating the wasted space of the aligned SSD pages boundaries with compressed data according to one embodiment of the invention.

This application proposes that compressing the data segment to reduce the data, so that the metadata and data segment (together) would be less than 8 KB (fit inside 2 SSD pages), thereby reducing the number of SSD IOPS required to read an 8 KB segment from the SSD. The proposal is captured in FIG. 7 diagram. FIG. 7 is block diagram 700 illustrating wasted space 701 of the aligned SSD pages boundaries with compressed data according to one embodiment of the invention.

The advantages of the above approach are obvious. Where it would take 3 or even 4 SSD IOs, we could now be done with 2 SSD IOs. Reducing the number of SSD IOs required for serving one segment read, enables the SSD to serve more segment reads in parallel (implying higher IOPs for the application).

However, there are cases where the compression algorithm would expand the data. In those cases, there is no point trying to store the compressed data. This saves us the CPU to decompress. A bit in the status flags held in the metadata can tell whether the data is compressed or not, and upon reading the segment, we would decompress only if required.

Further, when encryption is enabled on this data, the compressed data block is smaller than the original block, and therefore reduces the CPU cost required to encrypt and decrypt the data.

Figure 8:
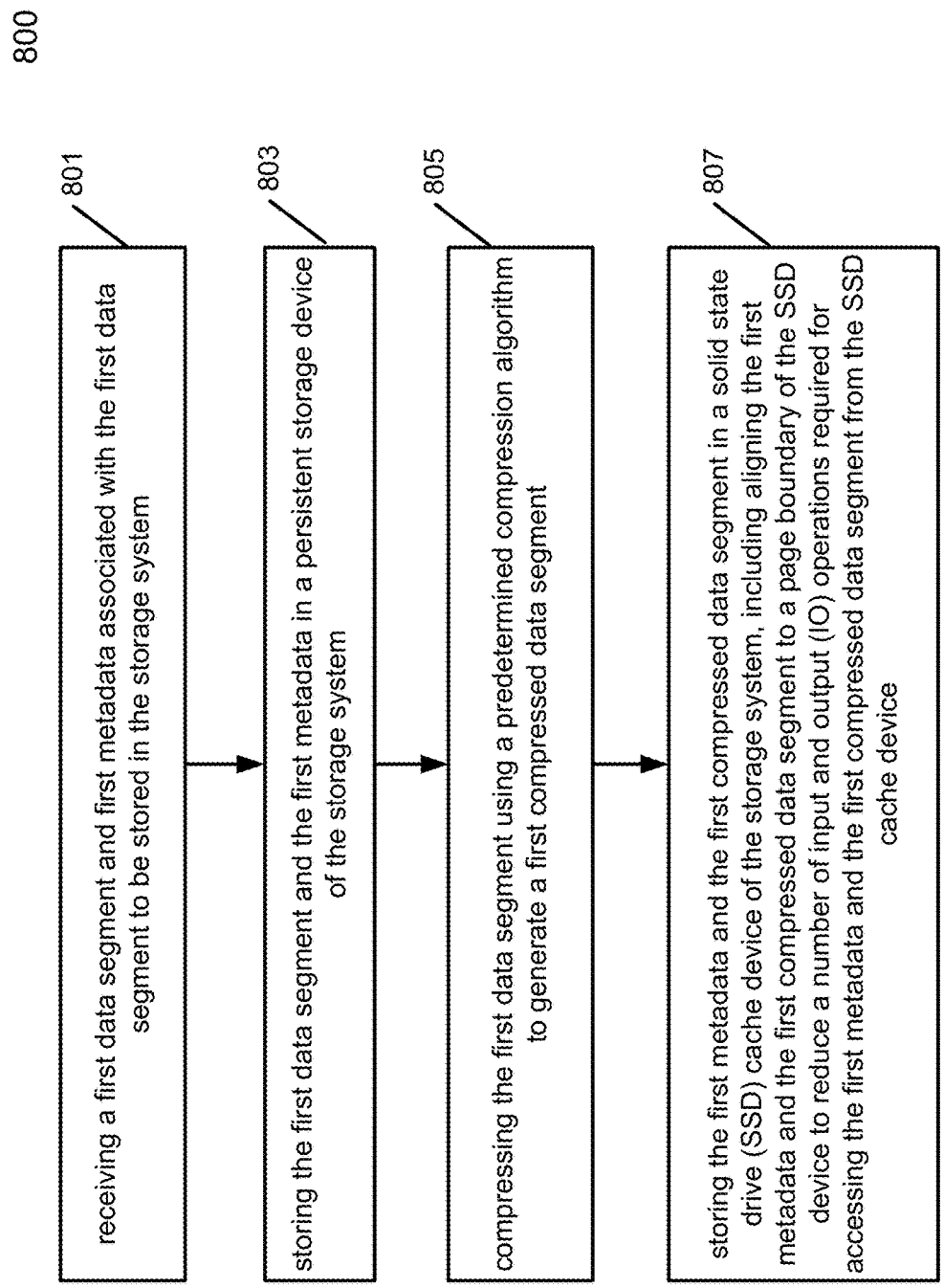
FIG. 8 is a flowchart illustrating a process of writing a data segment, according to an embodiment of the application.

FIG. 8 is a flow diagram illustrating a process of writing a data segment according to one embodiment of the invention. Process 800 may be performed by processing logic that includes hardware (e.g. circuitry, dedicated logic, etc.), software (e.g., embodied on a non-transitory computer readable medium), or a combination thereof. For example, process 800 may be performed by 122, 123, 124 of FIG. 1.

Referring to FIG. 8, at operation 801, storage system 100 can receive a first data segment and first metadata associated (e.g., 303) with the first data segment (e.g., 301) to be stored in the storage system, according to an embodiment. At operation 803, storage system 100 can store the first data segment (e.g., 303) and the first metadata (e.g., 301) in a persistent storage device (e.g., 108, 109) of the storage system (e.g., 104), according to an embodiment. At operation 805, storage system 100 can compress the first data segment (e.g., 303) using a predetermined compression algorithm to generate a first compressed data segment, according to an embodiment. At operation 807, storage system 100 can store the first metadata (e.g., 301) and the first compressed data segment (e.g., 123) in a solid state drive (SSD) cache device (e.g., 124) of the storage system, including aligning the first metadata and the first compressed data segment to a page boundary of the SSD device to reduce a number of input and output (IO) operations required for accessing the first metadata and the first compressed data segment from the SSD cache device, according to an embodiment.

In an embodiment, storage system 100 can examine the first compressed data segment (e.g., 123) to determine whether a size of the first compressed data segment is smaller than a predetermined threshold (e.g., 4 KB). For example, the first compressed data segment (e.g., 123) is stored in the SSD cache device (e.g., 124) in response to determining that the size of the first compressed data segment is smaller than the predetermined threshold, according to an embodiment.

In an embodiment, the first compressed data segment (e.g., 123) is stored in the SSD cache device (e.g., 124) if storing the first compressed data segment (e.g., 123) requires fewer number of pages of the SSD cache device than storing the first data segment without compression. Further, the first compressed data segment (e.g., 123) is stored in the SSD cache device (e.g., 124) only if the size of the first compressed data segment (e.g., 123) is smaller than the first data segment without compression, according to an embodiment. Furthermore, if the size of the first compressed data segment is larger than the predetermined threshold, the first data segment is stored in the SSD cache device (e.g., 124) without compression, according to an embodiment.

In an embodiment, storage system 100 can further comprise setting a first flag in the first metadata (e.g., 301) to a predetermined value to indicate that the first data segment (e.g., 303) has been compressed, prior to storing the first metadata and the first compressed data segment in the SSD cache device (e.g., 124), such that when the first compressed data segment (e.g., 123) is read from the SSD cache device (e.g., 124), the first compressed data segment can be decompressed properly. Further, storage system 100 can comprise encrypting the first compressed data segment (e.g., 123) to further reduce the size of the first compressed data segment, wherein the first compressed data segment (e.g., 123) is stored in the SSD cache device (e.g., 124) in an encrypted form, according to an embodiment.

Figure 9:
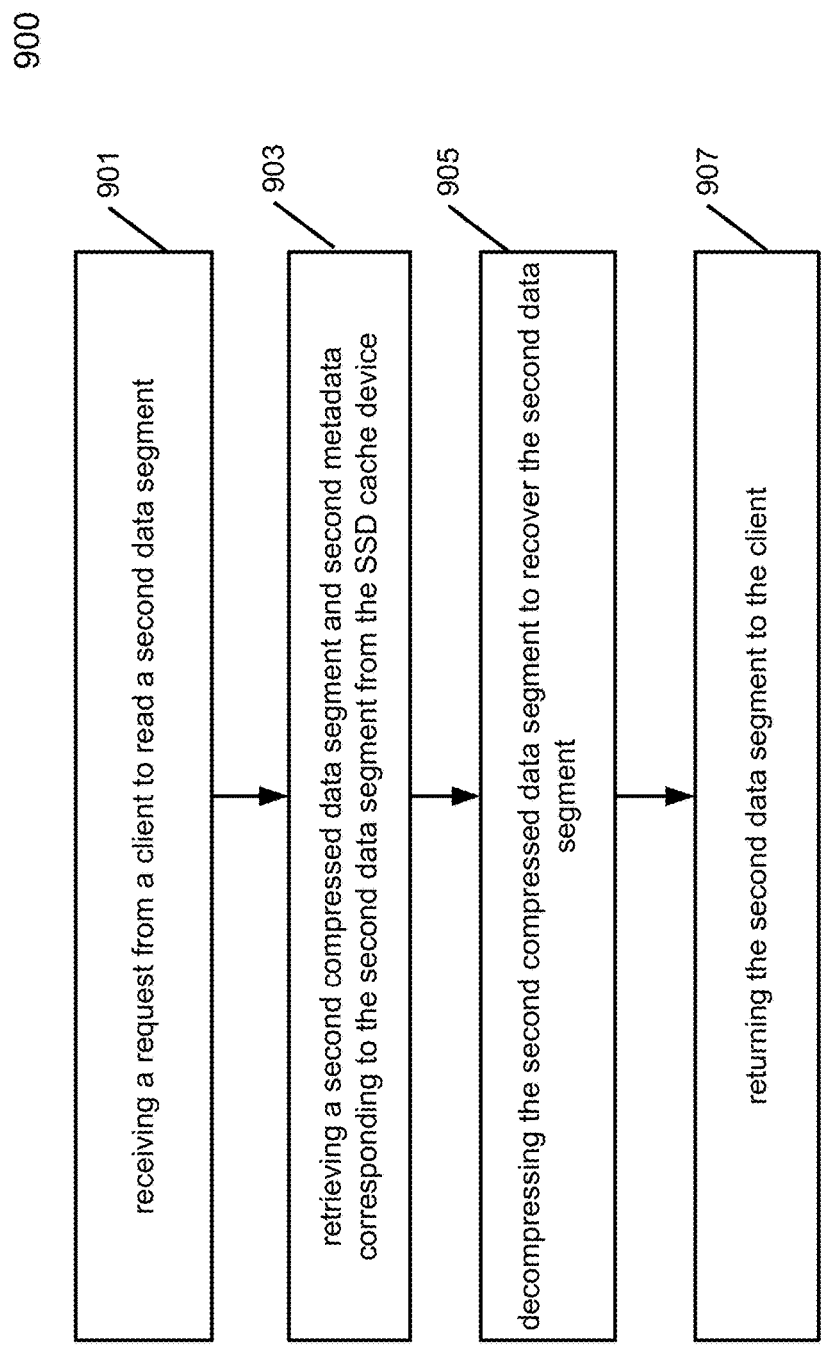
FIG. 9 is a flowchart illustrating a process of reading a data segment, according to an embodiment of the application.

FIG. 9 is a flow diagram illustrating a process of reading a data segment according to one embodiment of the invention. Process 900 may be performed by processing logic that includes hardware (e.g. circuitry, dedicated logic, etc.), software (e.g., embodied on a non-transitory computer readable medium), or a combination thereof. For example, process 800 may be performed by 122, 123, 124 of FIG. 1.

Referring to FIG. 9, at operation 901, storage system 100 can receive a request from a client (e.g., 101, 102) to read a second data segment, according to an embodiment. At operation 903, a storage system 100 can retrieve a second compressed data segment and second metadata corresponding to the second data segment from the SSD cache device (e.g., 124) according to an embodiment. At operation 905, a storage system 100 can decompress the second compressed data segment to recover the second data segment, according to an embodiment. At operation 907, a storage system 100 can return the second data segment to the client (e.g., 101, 102), according to an embodiment.

Further, storage system 100 can examine a second flag stored in second metadata to determine whether the second flag has been set to a predetermined value, wherein the second compressed data segment is decompressed when the second flag has been set to the predetermined value, according to an embodiment Note that some or all of the components as shown and described above (e.g., 104, 122, 123, 124 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Deduplication Engine

Figure 10:
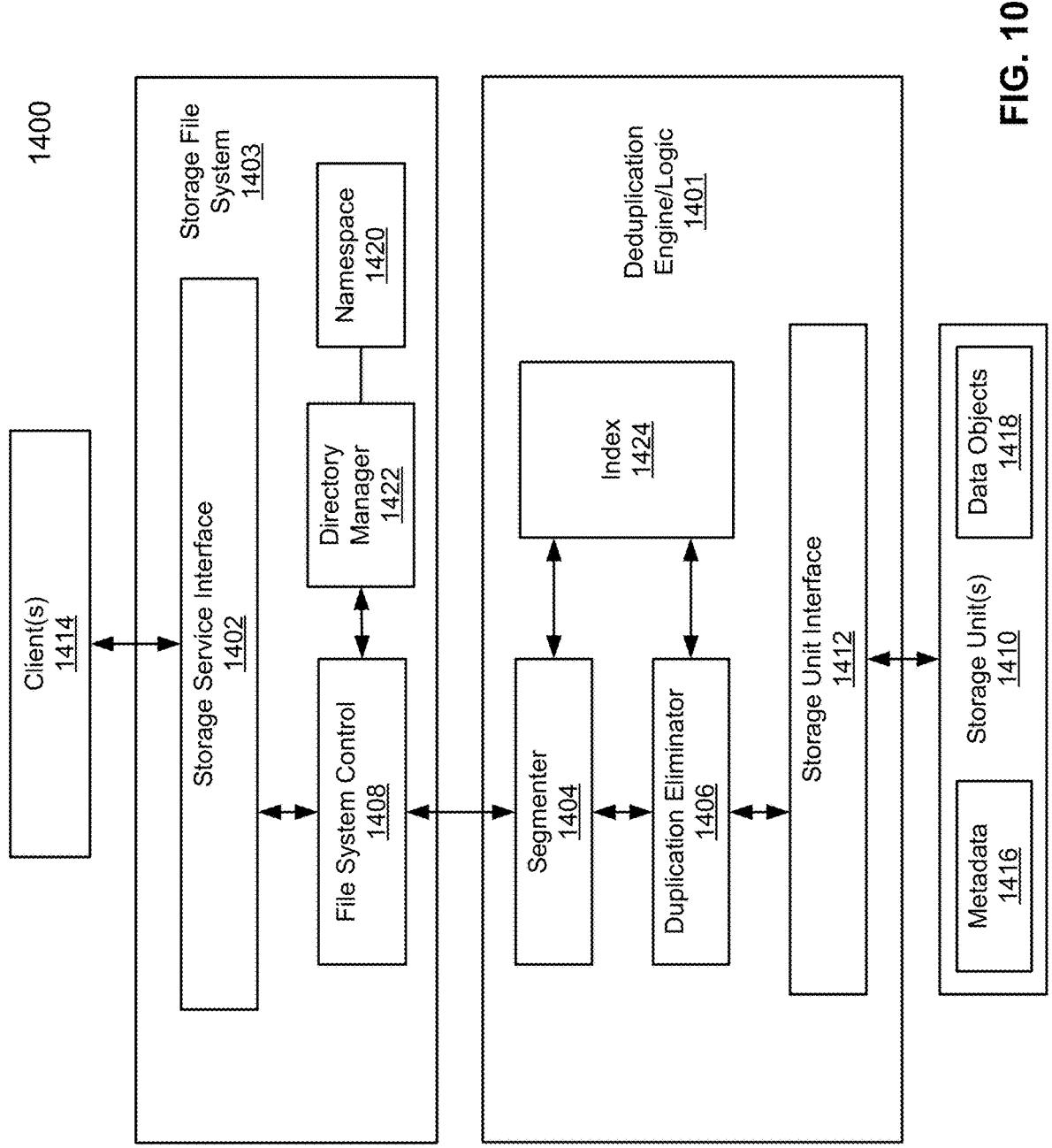
FIG. 10 is a block diagram illustrating a deduplicated storage system according to one embodiment of the invention.

FIG. 10 is a block diagram illustrating a deduplication storage system according to one embodiment of the invention. For example, deduplication storage system 1400 may be implemented as part of a deduplication storage system as described above, such as, for example, the deduplication storage system as a client and/or a server described above. In one embodiment, storage system 1400 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1400 may have a distributed architecture, or all of its components may be integrated into a single unit. Storage system 1400 may be implemented as part of an archive and/or backup system, or a disaster recovery system, such as a deduplicating storage system available from EMC® Corporation of Hopkinton, Mass.

In one embodiment, storage system 1400 includes deduplication logic 1401 interfacing one or more clients 1414, via file system 1403, with one or more storage units 1410 storing metadata 1416 and data objects 1418. Clients 1414 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1410 may be implemented locally (e.g., single node operating environment) or remotely (e.g., multi-node operating environment) via an interconnect, which may be a bus and/or a network (e.g., a storage network). In one embodiment, one of storage units 1410 operates as an active storage to receive and store external or fresh user data from a client (e.g., an end-user client or a primary storage system associated with one or more end-user clients), while the another one of storage units 1410 operates as a target storage unit to periodically archive data from the active storage unit according to an archiving policy or scheme.

Storage units 1410 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1410 may also be combinations of such devices. In the case of disk storage media, the storage units 1410 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1416, may be stored in at least some of storage units 1410, such that files can be accessed independent of another storage unit. Metadata of each storage unit includes enough information to provide access to the files it contains. In one embodiment, metadata may include fingerprints or representatives contained within data objects 1418, where a data object may represent a data segment (also referred to as a data chunk), a compression region (CR) of one or more data segments, or a container of one or more CRs. Fingerprints are mapped to a particular data object via metadata 1416, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1416 may include a file name, a storage unit identifier (ID) identifying a storage unit in which the segments associated with the file name are stored, reconstruction information for the file using the segments, and any other appropriate metadata information. Metadata 1416 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 1403 includes file service interface 1402, file system control logic 1408, directory manager 1422, and namespace 1420. Deduplication logic 1401 includes segmenter 1404 (also referred to as a segmenting module or unit), duplicate eliminator 1406, and storage unit interface 1412. File system control 1408 receives a file or files (or data item(s)) via file service interface 1402, which may be part of a file system namespace 1420 of file system 1403 associated with the deduplication logic 1401. The file system namespace 1420 refers to the way files are identified and organized in the system. An example is to organize the files hierarchically into directories or folders, which may be managed by directory manager 1422. File service interface 1412 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 1404 and file system control 1408. Segmenter 1404, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1408, also referred to as a file system manager, processes information to indicate the segment(s) association with a file. In some embodiments, a list of fingerprints is used to indicate segment(s) associated with a file. File system control 1408 passes segment association information (e.g., representative data such as a fingerprint) to index 1424. Index 1424 is used to locate stored segments in storage units 1410 via storage unit interface 1412. In one embodiment, index 1424 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 1424 maps a fingerprint of a segment to a container identifier identifying a container that contains the corresponding segment.

In one embodiment, index 1424 includes a persistent hash-table of segment-IDs keyed either by the digest of the data stored in the segment or by the deduplication key of the data stored in the segment. The index 1424 need not contain entries for every data segment in the deduplication domain, but the effectiveness of deduplication is a function of the number of entries stored in the index 1424. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 1424) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplicate eliminator 1406, also referred to as a segment store, identifies whether a newly received segment has already been stored in storage units 1410. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1410 that make up the file. Segments are then packed by a container manager (which may be implemented as part of storage unit interface 1412) into one or more storage containers stored in storage units 1410. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 1402 is configured to communicate with file system control 1408 to identify appropriate segments stored in storage units 1410 via storage unit interface 1412. Storage unit interface 1412 may be implemented as part of a container manager. File system control 1408 communicates (e.g., via segmenter 1404) with index 1424 to locate appropriate segments stored in storage units via storage unit interface 1412. Appropriate segments are retrieved from the associated containers via the container manager and are used to construct the requested file. The file is provided via interface 1402 in response to the request. In one embodiment, file system control 1408 utilizes a tree (e.g., a segment tree obtained from namespace 1420) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 1400 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 1401) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
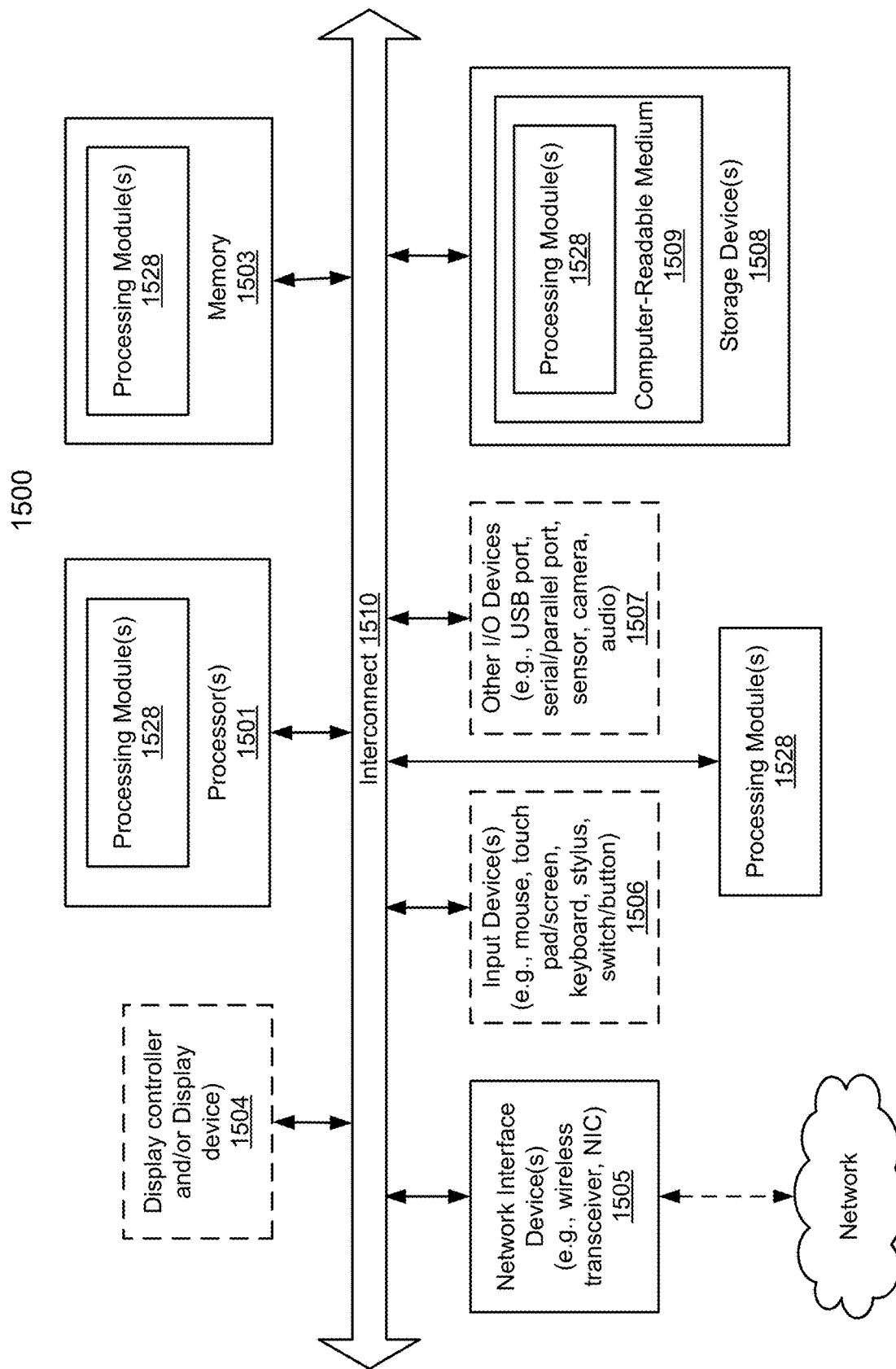
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a compression module 122, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of a storage system, comprising:
   receiving a data segment and metadata associated with the data segment to be stored in the storage system;
   storing the data segment and the metadata in a persistent storage device of the storage system;
   compressing the data segment using a predetermined compression algorithm to generate a compressed data segment; and
   on a condition that storing a concatenation of the metadata and the compressed data segment requires fewer pages of a solid-state drive (SSD) cache device of a storage system than storing a concatenation of the metadata and the data segment:
      storing the concatenation of the metadata and the compressed data segment to a page boundary of the SSD; and
      setting a flag in the metadata to indicate that the compressed data segment has been compressed using the predetermined compression algorithm, such that when the compressed data segment is read from the SSD cache device, the compressed data segment can be decompressed; and
   on a condition that storing the metadata and the compressed data segment in the SSD, wherein the concatenation of the metadata and the compressed data segment are aligned to a page boundary of the SSD, does not require fewer pages of the SSD than storing a concatenation of the metadata and the data segment, storing the concatenation of the metadata and the data segment to the page boundary of the SSD.

2. The method of claim 1, further comprising:
   examining the compressed data segment to determine whether a size of the compressed data segment is smaller than a predetermined threshold, wherein the compressed data segment is stored in the SSD cache device in response to determining that the size of the compressed data segment is smaller than the predetermined threshold.

3. The method of claim 2, wherein the compressed data segment is stored in the SSD cache device only if the size of the compressed data segment is smaller than the data segment without compression.

4. The method of claim 2, wherein if the size of the compressed data segment is larger than the predetermined threshold, the data segment is stored in the SSD cache device without compression.

5. The method of claim 1, further comprising:
   storing the compressed data segment in the SSD cache device in an encrypted form, wherein the encrypting reduces a size of the compressed data segment.

6. The method of claim 1, further comprising:
   receiving a request from a client to read a second data segment;
   retrieving a second compressed data segment and second metadata corresponding to the second data segment from the SSD cache device;
   decompressing the second compressed data segment to recover the second data segment; and
   returning the second data segment to the client.

7. The method of claim 6, further comprising:
examining a second flag stored in second metadata to determine whether the second flag has been set to a predetermined value, wherein the second compressed data segment is decompressed when the second flag has been set to the predetermined value.

8. A non-transitory machine-readable medium having instructions stored therein, which when executed by a processor, cause the processor to:
receive a data segment and metadata associated with the first data segment to be stored in a storage system;
store the data segment and the metadata in a persistent storage device of the storage system;
compress the data segment using a predetermined compression algorithm to generate a first-compressed data segment; and
on a condition that storing a concatenation of the metadata and the compressed data segment requires fewer pages of a solid-state drive (SSD) cache device of a storage system than storing a concatenation of the metadata and the data segment:
store the concatenation of the metadata and the compressed data segment to a page boundary of the SSD; and
set a flag in the metadata to indicate that the compressed data segment has been compressed using the predetermined compression algorithm, such that when the compressed data segment is read from the SSD cache device, the compressed data segment can be decompressed; and
on a condition that storing the metadata and the compressed data segment in the SSD, wherein the concatenation of the metadata and the compressed data segment are aligned to a page boundary of the SSD, does not require fewer pages of the SSD than storing a concatenation of the metadata and the data segment, store the concatenation of the metadata and the first data segment to the page boundary of the SSD.

9. The non-transitory machine-readable medium of claim 8, further comprising:
examining the compressed data segment to determine whether a size of the compressed data segment is smaller than a predetermined threshold, wherein the compressed data segment is stored in the SSD cache device in response to determining that the size of the compressed data segment is smaller than the predetermined threshold.

10. The non-transitory machine-readable medium of claim 9, wherein the compressed data segment is stored in the SSD cache device only if the size of the compressed data segment is smaller than the first data segment without compression.

11. The non-transitory machine-readable medium of claim 9, wherein if the size of the compressed data segment is larger than the predetermined threshold, the data segment is stored in the SSD cache device without compression.

12. The non-transitory machine-readable medium of claim 1, further comprising:
storing the compressed data segment is in the SSD cache device in an encrypted form.

13. The non-transitory machine-readable medium of claim 8, further comprising:
receiving a request from a client to read a second data segment;
retrieving a second compressed data segment and second metadata corresponding to the second data segment from the SSD cache device;
decompressing the second compressed data segment to recover the second data segment; and
returning the second data segment to the client.

14. The non-transitory machine-readable medium of claim 13, further comprising:
examining a second flag stored in second metadata to determine whether the second flag has been set to a predetermined value, wherein the second compressed data segment is decompressed when the second flag has been set to the predetermined value.

15. A system, comprising:
a processor; and
a memory coupled to the processor to store instructions, which when executed by the processor, cause the processor to:
receive a data segment and metadata associated with the data segment to be stored in a storage system;
store the data segment and the metadata in a persistent storage device of the storage system;
compress the data segment using a predetermined compression algorithm to generate a compressed data segment; and
on a condition that storing a concatenation of the metadata and the compressed data segment requires fewer pages of a solid-state drive (SSD) cache device of a storage system than storing a concatenation of the metadata and the data segment:
store the concatenation of the metadata and the compressed data segment to a page boundary of the SSD; and
set a flag in the metadata to indicate that the compressed data segment has been compressed using the predetermined compression algorithm, such that when the compressed data segment is read from the SSD cache device, the compressed data segment can be decompressed; and
on a condition that storing the metadata and the compressed data segment in the SSD, wherein the concatenation of the metadata and the compressed data segment are aligned to a page boundary of the SSD, does not require fewer pages of the SSD than storing a concatenation of the metadata and the data segment, store the concatenation of the metadata and the data segment to the page boundary of the SSD.

16. The system of claim 15, further comprising:
examining the compressed data segment to determine whether a size of the compressed data segment is smaller than a predetermined threshold, wherein the compressed data segment is stored in the SSD cache device in response to determining that the size of the compressed data segment is smaller than the predetermined threshold.

17. The method of claim 5, further comprising:
encrypting the data segment to generate a first encrypted data segment;
encrypting the compressed data segment to generate a first encrypted compressed data segment; and
on a condition that storing the metadata and the encrypted compressed data segment in the SSD, wherein the concatenation of the metadata and the encrypted compressed data segment are aligned to a page boundary of the SSD, does not require fewer pages of the SSD than storing a concatenation of the metadata and the encrypted data segment, storing the concatenation of the metadata and the encrypted data segment to the page boundary of the SSD.

18. The method of claim 5, further comprising:
encrypting the data segment to generate a encrypted data segment;
encrypting the compressed data segment to generate a encrypted compressed data segment; and
on a condition that storing the metadata and the encrypted compressed data segment in the SSD, wherein the concatenation of the metadata and the encrypted compressed data segment are aligned to a page boundary of the SSD, requires fewer pages of the SSD than storing a concatenation of the metadata and the encrypted data segment, storing the concatenation of the metadata and the encrypted compressed data segment to the page boundary of the SSD.

19. The non-transitory machine-readable medium of claim 8, the instructions further causing the processor to:
encrypt the data segment to generate encrypted data segment;
encrypt the compressed data segment to generate encrypted compressed data segment; and
on a condition that storing the metadata and the encrypted compressed data segment in the SSD, wherein the concatenation of the metadata and the encrypted compressed data segment are aligned to a page boundary of the SSD, does not require fewer pages of the SSD than storing a concatenation of the metadata and the encrypted data segment, store the concatenation of the metadata and the encrypted data segment to the page boundary of the SSD.

20. The non-transitory machine-readable medium of claim 8, the instructions further causing the processor to:
encrypt the data segment to generate encrypted data segment;
encrypt the compressed data segment to generate encrypted compressed data segment; and
on a condition that storing the metadata and the encrypted compressed data segment in the SSD, wherein the concatenation of the metadata and the encrypted compressed data segment are aligned to a page boundary of the SSD, requires fewer pages of the SSD than storing a concatenation of the metadata and the encrypted data segment, store the concatenation of the metadata and the encrypted compressed data segment to the page boundary of the SSD.

\* \* \* \* \*